United States Patent [19]

Wotring et al.

[11] Patent Number: 5,192,042

[45] Date of Patent: Mar. 9, 1993

[54] HOLDER FOR VCR AND TV REMOTE CONTROLS

[76] Inventors: Randall C. Wotring, 9824 Blackburn, Livonia, Mich. 48150; Richard N. Clark, 25360 Lynford Dr., Farmington Hills, Mich. 48018

[21] Appl. No.: 429,969

[22] Filed: Nov. 1, 1989

[51] Int. Cl.⁵ .............................................. A47F 7/00
[52] U.S. Cl. ................................ 248/176; 248/205.2; 211/13; 211/194
[58] Field of Search ............ 248/176, 146, 346, 205.2; 211/126, 189, 13, 194, 188, 135, 42, 43, 13; 403/331, 381, 407.1; 256/1, 23; 206/504, 558; 108/91; 297/1

[56] References Cited

U.S. PATENT DOCUMENTS

| | | | |
|---|---|---|---|
| 2,123,290 | 7/1938 | Powers | 248/174 |
| 3,120,410 | 2/1964 | Berg | 297/439 X |
| 3,217,671 | 11/1965 | Walsh | 108/91 |
| 3,695,190 | 10/1972 | Bucholz | 211/188 X |
| 3,737,031 | 6/1973 | Carroll | 206/504 |
| 4,138,015 | 2/1979 | Rabley | 211/126 X |
| 4,429,796 | 2/1984 | Sussman | 211/189 X |
| 4,494,659 | 1/1985 | Simon et al. | 211/126 X |
| 4,852,746 | 8/1989 | Wells et al. | 211/13 |
| 4,856,658 | 8/1989 | Novak | 211/43 X |
| 4,905,438 | 3/1990 | Brennan | 248/221.4 X |
| 4,911,389 | 3/1990 | Self | 248/146 |
| 4,940,137 | 7/1990 | Straub | 206/504 X |

FOREIGN PATENT DOCUMENTS

| | | | |
|---|---|---|---|
| 2013083 | 12/1971 | Fed. Rep. of Germany | 211/188 |
| 3023974 | 1/1982 | Fed. Rep. of Germany | 248/314 |
| 109814 | 2/1944 | Sweden | 248/676 |
| 386640 | 4/1965 | Switzerland | 297/439 |

Primary Examiner—Alvin C. Chin-Shue
Attorney, Agent, or Firm—Barnes, Kisselle, Raisch, Choate, Whittemore & Hulbert

[57] ABSTRACT

A holder for VCR and TV remote control units and other articles of like dimension in the form of a one-piece extrusion having a central web like panel with a predetermined length and thickness dimension adapted to removably receive thereon the unit or article to be held by the holder. The holder has a pair of side walls disposed in spaced apart parallel relationship connected to said web panel along the opposite longitudinal edges thereof. The central web is positioned approximately midway between the opposite longitudinal edges of each side wall such that the holder generally has an "H" configuration in transverse cross section. The side walls have their respective height dimensions, in a horizontal orientation of the center web, equal to one another and slightly greater than the maximum thickness dimension of the associated remote control unit or article to be held by the holder so that the same is nestable within the confines of receiving space defined by the side walls and center web panel. One of the side walls has a rib-like protrusion generally T-shaped in transverse cross section and extending longitudinally therealong and the other of the side walls has a channel-shaped protrusion extending longitudinally therealong and comprising mutually facing spaced apart pair of ribs having an L-shaped in transverse cross sections, the rib-like protrusion being endwise slidably internestable in the channel shaped protrusion of an associated second holder constructed in the same fashion.

23 Claims, 4 Drawing Sheets

HOLDER FOR VCR AND TV REMOTE CONTROLS

FIELD OF THE INVENTION

The present invention generally relates to a supporting console for remote control units, and more particularly to a holder for VCR and TV remote controls of the type used with home entertainment devices.

BACKGROUND OF THE INVENTION

In home entertainment, it is common to have an entertainment center which includes a variety of individual components, including such components as a television (TV), cable television channel selection box, video cassette recorder (VCR), compact disc player, phonograph, record player, AM/FM receiver, and/or an audio cassette player. It is also common to have separate remote control units which operate these components from a remote location, without physically contacting the corresponding component other than via a connecting cable, or, if of the wireless type now more prevalent, without having any connecting wiring between the remote control unit and the component.

Conventional remote control units include a plurality of pressure-or touch-sensitive switches arranged into a type of miniature keyboard. When one of these switches has been activated (normally by manually pressing them) the remote control emits a coded triggering beam signal which, if of the cable-connected type, is conducted via the cable connection to the associated controlled component. If the remote control unit is of the wireless type, the control signal is transmitted via modulated beam of radiant wave energy, usually infra-red, being directed toward the home entertainment center. The corresponding component receives this beam and electronically converts the coded signal to an instruction to vary an operating characteristic of the entertainment center (for example, a television may be turned on or off). If a different switch is pressed, a different coded signal is emitted, and a different operating characteristic of the component may be altered (for example, a television channel).

Some entertainment centers, although composed of individual components, may be operated from a single remote control unit. However, a large majority of entertainment centers are composed of components obtained from a variety of manufacturers, of each which uses a different remote control coding system. Therefore, it may be necessary to have one remote control unit to control a television, a different remote control unit to control a video cassette recorder, and yet a different remote control unit to control a pay cable channel selection box. This is a disadvantageous inconvenience to the operator of the entertainment center.

It has been known to place two of such remote control units "back-to-back", such that the keyboard portions of the two units are outwardly and oppositely facing, yet the control beam emitting lenses are commonly oriented, and to wrap an elastic band around the resulting cluster. This allows the operator of the clustered combination to operate either of the two units by simply inverting the cluster and operating the desired remote control unit. However, this configuration is only suitable for a combination of two remote control units. Furthermore, when the cluster is placed on a tabletop, desk, etc., there is a risk that the switches on the downwardly-facing remote control unit will inadvertently be triggered, and if the unit is dropped, the switches or other elements of the unit may be damaged.

In an effort to alleviate these problems, numerous holders have been provided in the prior art that are adapted to store and support various kinds of TV and VCR remote controls. U.S. Pat. Nos. 4,660,792; 4,712,693 and 4,739,897, and certain of the references cited therein, are illustrative of such prior art.

However, there is still a need for a holder device of this type which will allow a plurality of remote control units to be easily stored and conveniently oriented for operation from a central location, without the risk of inadvertent triggering of the units, and which, as compared to such prior art, is structurally simpler, less costly to manufacture and more versatile for expanded usages. There is also a need for such a holder which is universal in capacity for a variety of different size remote control units, and also multi-functional to serve a variety of other tasks ancillary to enjoyment of a home entertainment center.

OBJECTS OF THE INVENTION

Accordingly, it is an object of the present invention to provide an improved central console for removably holding a plurality of remote control units which satisfies all of the aforementioned needs and yet still accomplishes the basic objects of the prior art, namely, to provide a means for allowing a plurality of remote control units to be easily stored and operated from a central location, both for convenience of use and to prevent misplacement, and without the risk of inadvertent triggering of the units; supporting the control units in a spaced-apart relationship such that the triggering means of each of the remote control units is commonly oriented, enabling the remote control units to be conveniently operated without removal from the console, and yet which is less expensive, lighter in weight and simpler to operate or use than prior art holders of this nature.

Another object is to provide an improved holder of the above character which provides substantial protection to the remote control unit(s) stored in the holder and which protects furniture from being scratched.

Yet another object is to provide an improved holder of the above character which may be readily coupled to identical holders to provide an array of a multiplicity of holders for storing additional remote control units or for other home entertainment center paraphernalia such as VCR tapes, music tapes, compact discs, etc.

Still another object is to provide a holder of the aforementioned character which is adapted to provide accessory functions such as a holder for pencils or pens, and to provide readily accessible and readily visible surface area for attachment of marking and instruction labels without interfering with the primary functions of the holder.

The above objects as well as other objects, features and advantages of the present invention will become apparent from the following detailed description of the best modes presently known for carrying out the invention, when taken in conjunction with the accompanying scaled drawings and appended claims.

DETAILED DESCRIPTION OF THE PREFERRED EMBODIMENTS

Referring in more detail to the drawings, in which like numerals represent identical parts throughout the several views and numerals raised by a prime suffix represent parts alike in function, FIGS. 1-6 illustrate a first embodiment of a remote control holder 20 of the invention primarily used for detachably receiving a television remote control (designated TV/RC) and/or a video cassette recorder remote control (designated VCR/RC). As hereinafter more fully described, holder 20 provides a common control source for both a VCR and TV. Typically, such wireless-type remote control units TV/RC and VCR/RC employ infra red radiation projected endwise from the unit to an infra-red sensor on the associated TV or VCR, and generally require an unobstructed radiating field for best operation between the remote control and the associated receiving unit.

Figures 1, 2:
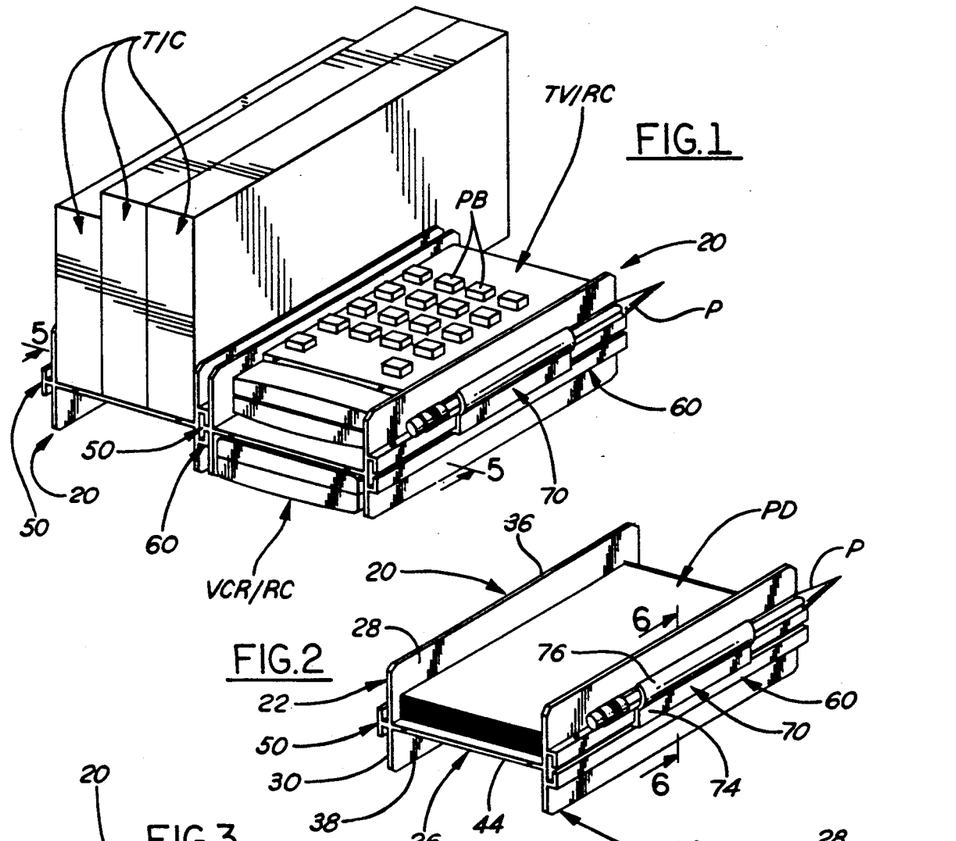
FIG. 1 is a perspective view of a first preferred embodiment of a pair of remote control unit holders of the present invention shown intercoupled as a unitary assembly, the holder on the right hand side of this view being shown with a TV and VCR remote control unit fixedly but removably supported therein in inverted relationship to one another, and the left hand holder of the pair being shown removably supporting a plurality of VCR tape packages.
FIG. 2 is a perspective view of one of the holders of FIG. 1 shown by itself and illustrating an alternate use namely, for holding a pad of paper or similar article such as a deck of playing cards.
Figure 4:
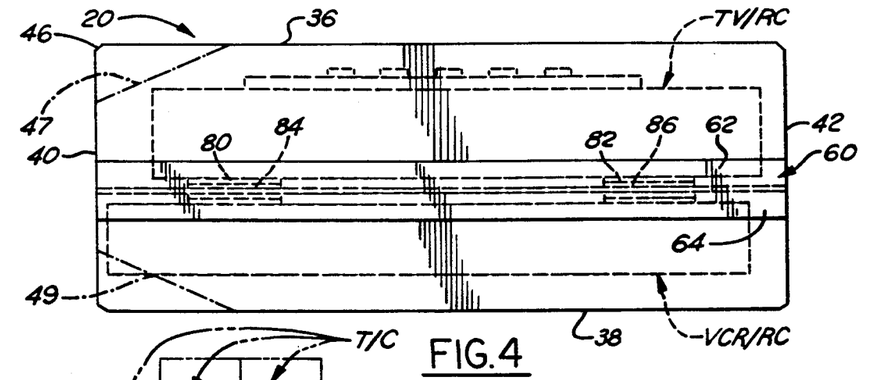
FIG. 4 is a side elevational view of the right hand side of the holder shown in FIG. 2, illustrating in phantom the TV and VCR remote controls supported therein as shown in FIG. 1, but without the pencil holder and associated pencil illustrated in FIGS. 1 and 2.
Figures 5, 6, 7, 8:
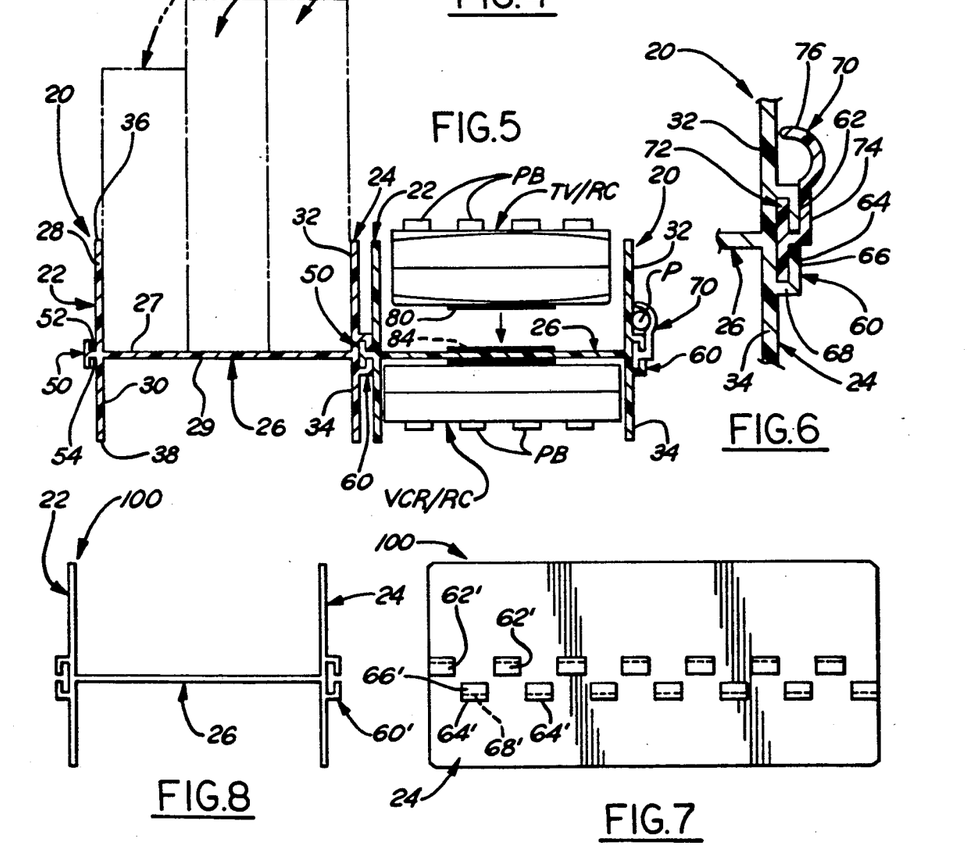
FIG. 5 is a vertical cross sectional view taken on the line 5—5 of FIG. 1 illustrating the VCR tape packages in phantom in the left hand holder and illustrating in the right hand holder the VCR remote control in the lower compartment and the TV remote control exploded upwardly from the upper compartment.
FIG. 6 is a fragmentary enlarged cross sectional view taken in the line 6—6 of FIG. 2, the pencil being omitted in this view.
FIG. 7 is a side elevational view of a second embodiment of a holder of the present invention.
FIG. 8 is an end elevational view of the holder of FIG. 7.

As best seen in FIGS. 1, 2 and 5, holder 20 in end elevation and transverse cross section has a generally broad "H" shaped configuration when viewed in its normal orientation for usage as shown in the drawings. Holder 20 thus comprises a pair of relatively thin, parallel side walls 22 and 24 integrally joined by a relatively thin flat central web 26. Each of the upright side walls comprises upper and lower sections or legs 28 and 30, and 32 and 34 respectively, the lower legs 30 and 34 being made shorter in vertical dimension than the upper legs 28 and 32. The upper and lower edges 36 and 38 of side walls 22 and 24 extend parallel to one another and to the plane of web 26. The lengthwise dimension of holder 20 is substantially greater than the width of the holder between walls 22 and 24, the lengthwise dimension generally being selected as a compromise between the shortest and longest remote control units available on the market. The cross sectional thickness of walls 22 and 24 as well as web 26 are the same and are uniform throughout the length of the holder. The end terminal edges 40 and 42 of side walls 22 and 24 as well as the end terminal edges 44 of web 26 are coplanar in a plane perpendicular to the side and end walls of the holder. Preferably the outer edge corners of each of the side walls 22 and 24 are beveled as at 46 in FIG. 4 to eliminate sharp corners.

Each holder 20 is adapted to removably intercouple with another identical holder 20 in side-by-side relationship as shown in FIGS. 1 and 5. For this purpose, side wall 22 is provided with a T-shaped rib 50 having a head portion 52 spaced outwardly from and extending parallel to the associated wall 22 and integrally joined thereto by a leg portion 54 (FIG. 5). Preferably rib 50 is coextensive in length with the associated side wall 22 and its end surfaces are coplanar with the associated end edges of side wall 22.

The opposite side wall 24 has an open box-shape channel 60 made up of two L-shaped upper and lower ribs 62 and 64 each having a vertical flange 66 spaced outwardly from side wall 24 and joined integrally thereto by a right angle leg 68 (FIG. 6). The spacing between the outer surface of side wall 24 and the inner surface of leg 66 is slightly greater than the thickness of head 52 of rib 50, and likewise the spacing between the parallel, mutually-facing edges of the flanges 66 of ribs 62 and 64 is slightly greater than the cross sectional thickness of the web 54 of rib 50. Channel 60, like rib 50, extends parallel to the longitudinal axis of the holder and is preferably coextensive in length with its associated side wall 24, the end edges of channel 60 being coplanar with the end edges 40 and 42 of side wall 24.

With each holder 20 being provided along its opposite side walls with one rib 50 and one channel 60, a pair of holders 20 may be readily coupled together by sliding the rib 50 of one holder into the channel 60 of the adjacent holder until the ends of the holders are flush with one another. Likewise, the holders may be readily uncoupled from one another merely by sliding the holders endwise oppositely relative to one another to uncouple the associated rib and channel.

Due to the provision of the coupling structure on the sides of the holders, auxiliary devices may be readily detachably coupled thereto, if desired. One such item is a pencil holder 70 (FIGS. 1, 2, 5 and 6) having a rib section 72, identical to the rib 50, and thus adapted for endwise sliding insertion into the slot of channel 60. Pencil holder 70 has an upright leg 74 adapted to closely flank upper rib 62 of channel 60, and a curved wall section 76 adapted in its free state condition to have its upper free end edge spaced slightly outwardly from wall 24 in its assembled condition on channel 60. The cavity thus defined between wall 76 of pencil holder 70 and the outer surface of wall 24 is adapted to yieldably and releasably receive a standard wood pencil P slidably inserted endwise therein as shown in FIGS. 1 and 2.

Figure 3:
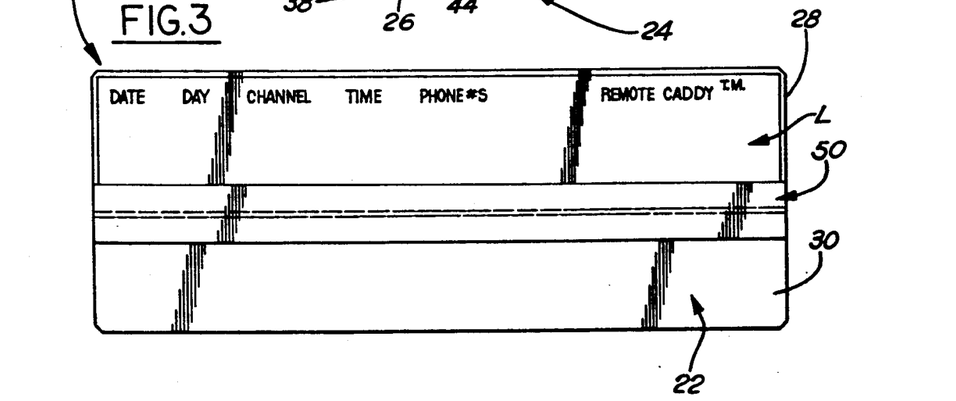
FIG. 3 is a side elevational view of the left hand side of the holder shown in FIG. 2.

Holder 20 is also adapted for another accessory feature, namely the provision of a handy writing surface strip affixed onto a selected exterior surface of one or both of the side walls 22 and 24. Preferably the writing surface is provided by a die cut label made of vinyl material with peel-off cover strip over a layer of adhesive on one side of the label strip One such label L is shown in FIG. 3 applied to the exterior surface of the upper leg 28 of side wall 22, above rib 50. Label L may be pre-printed with convenient memo inducia such as the "date", "day", "channel", "time", and "phone numbers", as indicated by placement of such labeling on label L in FIG. 3. The user may then remove pencil P from its holder 70 to make notations as indicated for his personal convenience.

As will be evident from the drawings, the top and bottom horizontal surfaces 27 and 29 of the horizontal web 26 of each holder 20 provide mounting surfaces for remote control units TV/RC and VCR/RC respectively. Preferably this is accomplished by employing commercially available fastening material, such as that sold under the trademark "Velcro", available in strip form with a self-adhering adhesive applied to one surface and covered by a peel-off cover material. Such Velcro strip material may be cut to suitable lengths to form attachment pads 80 adhesively affixed to selected spaced locations on the underside of the TV remote control TV/RC at say two locations spaced lengthwise thereof, as shown by the pads 80 and 82 in FIG. 4. Mating pads 84 and 86 are similarly applied to surface 27 of web 26 for releasable interengagement with pads 80 and 82. Similar Velcro strip pads are applied to the undersurface 29 of web 26 and to the under surface of the VCR remote control VCR/RC as shown in FIGS. 4 and 5. Thus, a selectively detachable connection is provided between remote control units TV/RC and VCR/RC and the mounting surfaces 27 and 29 of holder 20 which allows the remote control units to be selectively attached with their longitudinal axes parallel to that of holder 20 such that the beam emitting ends of the remote control units are commonly oriented parallel to the longitudinal axis of holder 20. If wire connected units are similarly placed in holder 20, the open end configuration allows for easy cable feed and lay.

With the appropriate dimensional relationship for holder 20 established as indicated hereinafter, it may be seen that the remote control units mounted upon holder 20 may be of different configurations, dimensions and weights without affecting their individual functioning or their interrelationship with holder 20. The operational push buttons PB of each remote control units are oriented to face outwardly away from the central web 26 for easy viewing and finger access.

After assembly of the remote control units to holder 20 as indicated above, the operation and use of holder 20 and the attached remote control units is straight forward. Holder 20 is positioned on a sufficiently flat surface so as to be supported by those longitudinal edges of the spaced side walls selected to face downwardly to rest upon the surface, depending upon which remote control unit is to be operated. For example, as shown in FIGS. 1 and 5, assuming that the television is to be controlled first, holder 20 is oriented with the TV/RC unit facing upwardly, and with the companion VCR/RC unit facing downwardly within its compartment. Then, when it is desired to operate the VCR, holder 20 is flipped over (rotated about 180° about its longitudinal axis) to bring the VCR/RC unit to the uppermost position, the TV/RC unit now being disposed therebeneath. The longitudinal axis of holder 20 is directed toward the entertainment center sensors (not shown) so that triggering beams of wireless remote control units are likewise directed to the corresponding components. Since holder 20 is open-ended, the holder itself does not obstruct beam radiation. Since both remote control units are commonly oriented it will be seen that the only movement of the holder necessary to shift between controlling the TV and the VCR is the aforementioned flip-over motion of the holder.

In one preferred working embodiment of the holder 20 constructed pursuant to the principles of the present invention, the following dimensions and parameters were selected as optimal:

| | |
|---|---|
| Horizontal spacing between side walls 22 and 24 | 3 inches |
| Cross sectional thickness of walls 22 and 24 and web 26 | 080 inches |
| Vertical dimension of side wall leg 28 from surface 27 to edge 36 | 1.30 inches |
| Vertical dimension of leg 30 from surface 29 to edge 38 | 1.038 inches |
| Vertical dimension of side walls 22 and 24 | 2.40 inches |
| Overall length of holder 20 | 6 inches |
| Material of holder 20 | ABS or rigid polyvinylchloride |
| Material of pencil holder 70 | low durometer, flexible PVC |
| Color of holders 20 and 70 | Black |

From the description and drawings as thus far set forth hereinabove, it will now be appreciated that holder 20 of the present invention amply fulfills the aforestated objects and provides many features and advantages over known prior art holders for VCR and TV remote controls. Holder 20 enables the user to organize, protect and to keep two or more remote control units together in a compact configuration. Due to its "H" cross sectional shape the two remote control units are removably secured back-to-back for ready selective access by simple inversion of the holder. The side wall legs associated with each remote control unit protect the associated remote control by keeping the operational push buttons PB of the same out of contact with the supporting surface for the holder. This also prevents the remote control units from being turned on or off accidentally which might otherwise occur by placement of the units themselves directly on a supporting surface. The relatively soft plastic material of holder 20 also prevents scratching or marring of furniture finishes.

The aforementioned dimensional relationships selected for holder 20 have been found to render holder 20 universal in that any size remote control unit presently available on the market can be nested in the holder as illustrated. With the open end configuration of the holder, any length remote control unit presently available on the market may be placed in the holder regardless of whether it is long enough to protrude beyond the open ends or short enough to nest with its opposite ends recessed within the opposite ends of the holder. The adhesive attachment of the remote control units to the holder, preferably with the "Velcro" system described above, allows the remote control units to be easily removed for battery replacement or used separate from the holder 20 if and when desired.

As indicated above, the "H" cross sectional shape of holder 20 preferably is not symmetrical, i.e., legs 30 and 34 are shorter than legs 28 and 32. This allows a thick remote control unit (having a large thickness dimension) to be mounted within the "deep" side of holder 20 and a thin remote control unit (having a relatively small thickness dimension) to be mounted on the "shallow" side of the holder. This still keeps the push buttons of each unit recessed relative to the longitudinal edges of the associated side walls, but nevertheless minimizes the overall vertical dimension of the holder in order to reduce bulkiness so that holder 20 can be held easily in one hand and the remote control units can be operated with fingers of one hand.

The ribbon/channel intercoupling structure 50/60 provided on the side walls of each holder 20 makes it possible to removably secure two or more holders 20 together by simply sliding the mating rib and channels of the respective holders together as described above. The female channel section 60 also readily accepts the male section of the pencil holder 70. The spring tension provided by the flexible curved wall 76 of holder 70 serves to releasably yieldably grip the pencil and renders it easy to slide the same in and out yet to be securely held by holder 70. The pencil holder is also arranged in a nested low profile relationship to the associated side wall 24 so that it does not interfere with use of holder 20 and nor the remote control units, nor with the fit of holder 20 comfortably in the user's hand. Due to the flexibility of holder 70, a large range of pencil diameters will fit into holder 70 without damaging the same.

The flat surface area provided by either both side walls 22 and 24 readily accepts the vinyl or other type removable label L so that the exposed side of the label can be written on with a pencil and readily erased as desired. The label writing surface can also be imprinted as indicated by non-erasable ink with directions and with brand identification and other product and user information.

One very important advantage of the configuration of the remote control holder 20 of FIGS. 1 through 6, as well as associated pencil holder 70, is the fact that the same can be readily mass produced by a conventional plastic extrusion process. It will be noted that the "H" configuration and the unchanging cross sectional configuration of holder 20 in a lengthwise direction enables holder 20 to be manufactured initially in strip form through extrusion dies from suitable plastic materials as a continuous length of extruded material. Individual holders 20 are then made from this long strip by cutting the same at the desired length increments (for example, the aforementioned 6 inch length intervals). The only other finishing operation required is the corner cutting or sanding operation to form bevels 46, if desired. It will be appreciated by those skilled in the art that holder 20 thus can be manufactured at a very low cost.

It is also to be understood that the contour of the mating and female sections of ribs 50 and channel 60, as well as pencil holder 70, should be designed so that they mate together firmly, preferably with a slight spring load, yet with a sliding fit, so that when two holders 20 are put together they are held together firmly. Likewise, pencil holder 70 should be sized and fitted so as to be held rigidly in position in the female slot of channel 60 and to have enough spring tension to relatively hold pencil P.

It will also be understood that holder 20 is adapted to a variety of uses in addition to providing a convenient mount for remote control units. As indicated in FIG. 1, a pair of holders 20 may be employed as shown, i.e., the right-hand holder 20 may contain the removably mounted remote control units whereas the left-hand holder 20 may be employed as a convenient stacking tray for one or more video tape, music tape or other type cassettes or cartridges T/C. These cartridges preferably are stacked on edge as indicated by manufacture instructions to better preserve the quality of the tapes as wound on the reels in the cassettes or cartridges. Alternatively, or supplementally, holder 20 may be used to hold a pad of paper PD as shown in FIG. 2, or other stacked material such as playing cards, either alone or in conjunction with a remote control unit releasably coupled to the opposite surface of the supporting web 26 of the holder, or in conjunction with an internested array of a plurality of holders 20. Similarly, holder 20 may be employed for use with other small hand-held devices, such as hand held calculators, etc.

Referring now to FIGS. 7 and 8, a second alternative embodiment 100 of a remote control holder of the present invention is illustrated which is adapted to be made by conventional plastic injection molded processes and equipment. Holder 100 is identical to holder 20 except for the configuration and structure of the female channel coupling structure 60' provided on side wall 24. Instead of a continuous channel 60, channel 60' is made of up two longitudinally extending rows of longitudinally spaced short rib sections 64', as best seen in FIG. 7. The bottom row of L-shaped ribs 64' corresponds to a continuous rib 64 of holder 20, and the upper row of longitudinally spaced ribs 62' corresponds to ribs 62 of holder 20. It will be noted that upper ribs 62' are offset in longitudinally staggered relationship with the lower ribs 64' but nevertheless the two rows of ribs 62' and 64' conjointly define an interrupted channel for receiving holder rib 50 or pencil holder 70 in the same manner as channel 60 of holder 20. However because of the interrupted array of upper and lower ribs 60' and 64', the interrupted channel can be made in an injection mold die set-up with suitable movable cores arranged to be retracted oppositely from one another parallel to the plane of the outer surface of side wall 24, it being understood that the parting line of the mold would fall on a plane bisecting web 26 of holder 100. Holder 100 thus illustrates how the principles of the invention may be embodied in an injection molded part, if desired Nevertheless, holder 20 is preferred over holder 100 because plastic extrusion tooling is less expensive than injection mold tooling and the cost per part is lower.

Figure 9:
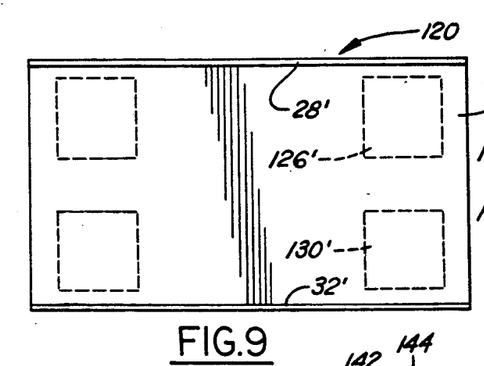
FIG. 9 is a top plan view of a third embodiment of a holder of the present invention.
Figure 10:
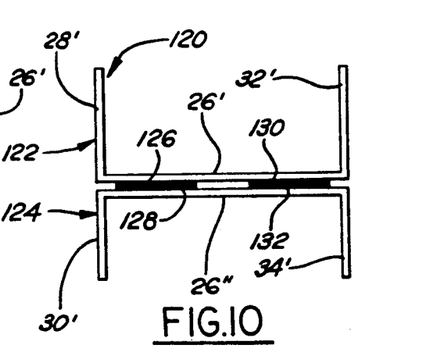
FIG. 10 is an end elevational view of the modified holder of FIG. 9.

FIGS. 9 and 10 illustrate a third embodiment of the invention comprising a holder 120 made in two pieces and assembled to form the "H" preferred cross sectional configuration of the holder of the invention. Holder 120 thus comprises two extruded parts 122 and 124 each having a open channel "C" configuration in transverse cross section. However, the upper part 122 is dimensioned so as to have oppositely disposed parallel side walls 28' and 32' corresponding in dimension to the longer or higher side wall legs 28 and 32 of holder 20. Likewise lower part 124, which is inverted relative to part 122, is dimensioned so as to have oppositely spaced parallel side walls 30' and 34' corresponding to the dimensions of shorter side wall legs 30 and 34 of holder 20. As shown in FIG. 10, the two parts 122, 124 may be adhesively secured together back-to-back by affixing suitable Velcro fastener pads 126 and 128, 130 and 132 to the mutually facing surfaces of the center webs 26' and 26" of parts 122 and 124. The remote control units TV/RC and VCR/RC are respectively mounted in parts 122 and 124 in the same manner as in the holder 20. If desired, parts 122 and 124 may be employed separately for each holding one remote control unit, or for a variety of other uses including those indicated above.

Figure 11:
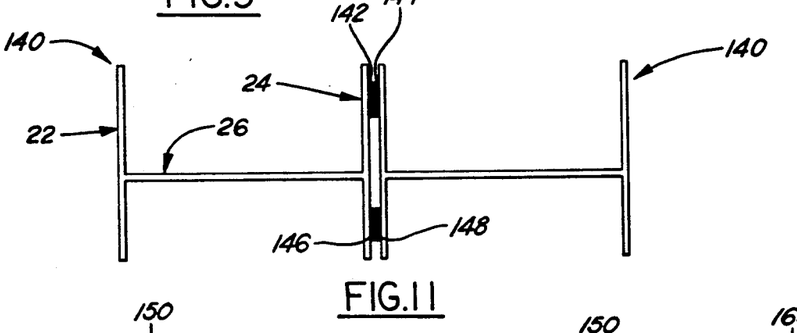
FIG. 11 is an end elevational view of a pair of fourth embodiment holders of the invention intercoupled for conjoint use.

A third embodiment of the invention is illustrated in FIG. 11 wherein a modified holder 140 is provided which is identical to holder 20 except that the same is not provided with the intercoupling rib 50 and associated intercoupling channel 60. As shown in FIG. 11, a pair of such holders 140 may be detachably secured in side-by-side relationship similar to that of FIG. 1 by means of the aforementioned Velcro pads 142 and 144, 146 and 148 suitably adhesively applied the exterior surfaces of side walls 22 and 24. Individual remote control units are mounted in holders 140 in the same manner as holder 20. Although the Velcro fasten of two holders reduce the holder part cost, the extruded or injected molded coupling rib 50 and channel 60 or 60' of the first and second embodiments will offer greater holding power, array security and longer service life.

Figure 12:
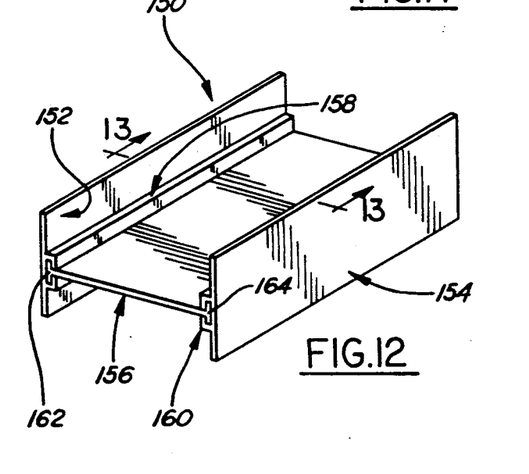
FIG. 12 is a perspective view of a fifth embodiment of the holder of the present invention.
Figure 13:
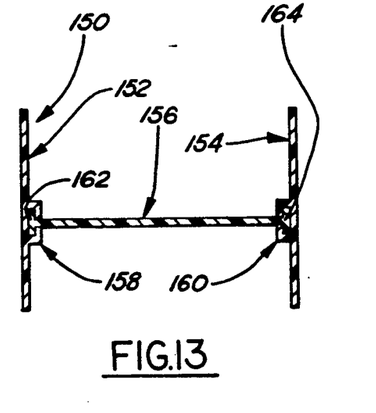
FIG. 13 is a vertical cross sectional view taken on the line 13—13 of FIG. 12.

A fifth embodiment of the holder in the invention is illustrated in FIGS. 12 and 13. Holder 150 of this embodiment is made of a three-piece extrusion comprising a pair of identical side walls 152 and 154 releasably coupled to a center web 156. Each side wall 152, 154 is extruded with a female channel section 158 and 160 respectively, which may be identical to channels 60 described previously. The center web 156 is extruded with a T-flange 162 and 164 along each longitudinal edge dimensioned for close sliding reception in the mating groove and slot provided in the female channels 158 and 160 of the associated side walls. It is to be understood that holder 150 also may be provided with intercoupling rib 50 and channel 60 in the manner of holder 20 as well as the accessory pencil holder 70 and label L. Holder 150 is advantageous from the standpoint of simlifying the extrusion dies, but does require two dies rather than one as in the holder 20. However by providing the holder in three pieces, the same may be shipped in a flat package and assembled by the user to thereby reduce packaging, shipping and display costs. Also, subdividing holders 150 into three parts allows individual part size to be varied while keeping other parts standard, if desired for particular applications and markets.

Figure 14:
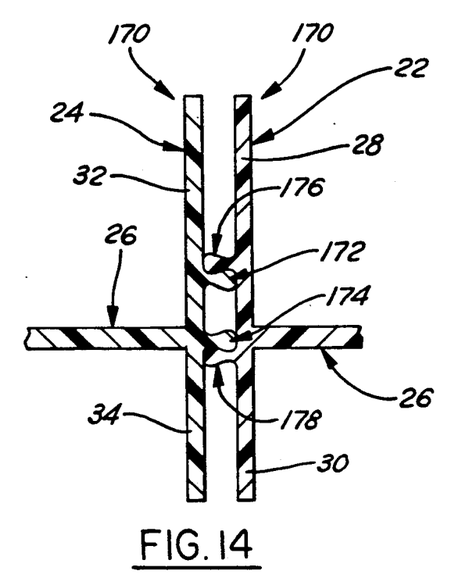
FIG. 14 is a fragmentary vertical cross sectional view of the intercoupled portions of a pair of sixth embodiment holders of the invention.
Figure 15:
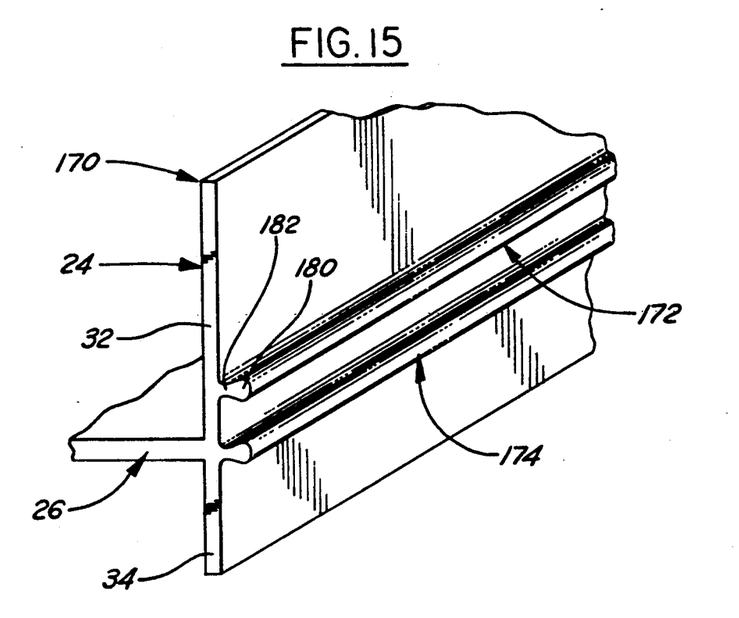
FIG. 15 is a fragmentary perspective view of the left hand holder of the pair shown in FIG. 14.

A sixth embodiment of the invention is illustrated in FIGS. 14 and 15. A holder 170 of this embodiment is identical to the first embodiment holder 20 except for the inter-holder coupling structure, the rib 50 and channel 60 of holder 20 being replaced by a interlocking ball rail design of the invention. Thus, as seen in FIGS. 14 and 15, side wall 24 of holder 170 is provided with a pair of vertically spaced identical ball rails 172 and 174, and as shown in FIG. 14 the opposite side wall 22 of holder 170 is provided with another pair of vertically spaced ball rails 176 and 178. All of the rails 172, 174, 176 and 178 are identical in transverse cross sectional configuration and each extend parallel to the longitudinal axis of holder 170. Each rail 172-178 thus has a thickened head portion 180 integrally joined by a thin leg portion 182 to its associated holder side wall. Head 180 has a circular configuration in transverse cross section of constant radius of curvature, preferably extending through 270° to provide a convex protuberance. Leg 182 has a concave exterior configuration on both of its opposite surfaces matching the curvature of head 180. The reverse curvature point is preferably located at a 45° angle from a vertical plane taken from the center curvature of head 180.

Preferably, in one working embodiment each rail 172-182 extends outwardly in a direction perpendicular to the associated side wall a distance of 0.170 inches, the radius of curvature of each head 180 is 0.050 inches, the vertical spacing between the center lines of ribs 172 and 174 is 0.308 inches and a vertical spacing between the center lines of ribs 176 and 178 is 0.450 inches. The distance between the center planes of interengaged mating ribs 176 and 172, and likewise 174 and 178 is preferably 0.071 inches.

When the ball rails 172-178 are so constructed and made from a suitable plastic material such as polyvinyl chloride, the rails will have sufficient flexibility to snap fit by pushing two holders 170 laterally together to bring the respective ball rails into internested and releasably locked relationship as shown in FIG. 14. With such intercoupling structure, a pair of holders 170 may be securely held together but can be snapped apart by laterally pulling the two holders 170 away from one another, or two holders may be slid apart by sliding the same in opposite longitudinally directions. Preferably, as in holder 20, ball rails 172 and 174 are co-extensive in length with the associated side walls of the holders and their end surfaces are flush with the end planes of the holder.

Ball rails 172-178 are thus advantageous in that they enable either a lateral snap together fit or an endwise slide together fit to releasably intercouple two holders together. The ball rails 172-178 are also easier to manufacture in an extrusion process, can be made to wider production tolerances and die wear will be less of a problem than with the configuration of rib 50 and channel 60 of holder 20. A modified pencil holder similar to holder 70 may be employed with ball rails 170-178 merely by modifying the shape of the rib 72 of holder 70 to fit between either rails 172 and 174 or rails 176 and 178. Alternatively the pencil holder may be made with its own ball rails corresponding to rails 172 and 174 to fit between holder rails 176 and 178, or vice versa.

Figure 16:
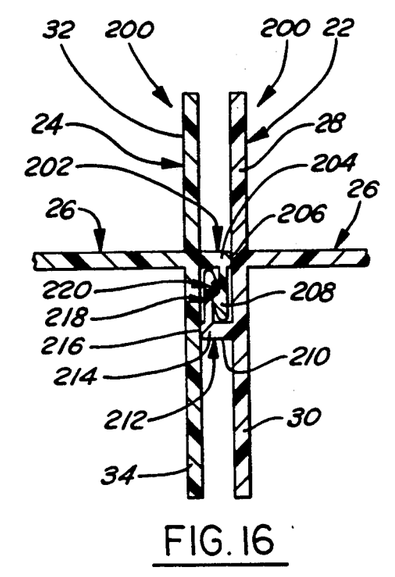
FIG. 16 is a fragmentary vertical cross sectional view of the intercoupled portions of a pair of seventh embodiment holders of the invention.

A seventh embodiment of the invention is illustrated in FIG. 16. A holder 200 of this embodiment is also identical to the first embodiment holder 20 except for the inter-holder coupling structure, i.e, rib 50 and channel 60 of holder 20, or the alternative rails 172-178 of the sixth embodiment of FIGS. 14 and 15, being replaced by an interlocking "L" configuration rail design of the invention. Thus, as seen in cross section in FIG. 16, side wall 24 of holder 200 is provided with a "L-shaped" coupling rail 202 having a horizontal leg 204 protruding integrally horizontally outwardly from the outer surface of wall 24 coplanar with panel 26 and terminating at its outer edge in a rounded rib surface 206. Rail 202 has a vertically downwardly extending leg 208 inset slightly toward wall 24 from rib surface 206 and terminating at its lower edge in a camming and locking rib 210.

The other wall 22 of holder 200 has another L-shaped coupling rail 212 identical in configuration to rail 202 but inverted relative thereto. Rail 212 thus has a horizontal leg 214 protruding horizontally from wall 22, but vertically offset from the plane of web panel 26. Leg 214 also terminates in an outer rounded rib 216 identical to rib 206. Likewise, rail 212 has a vertical, upwardly extending leg 218 with a camming and locking rib 220 at its free edge identical in relationship to rib 210 of rail 202.

It will be seen that the two L-rails 202 and 212 are adapted to intercouple and interlock two holders 200 in side-by-side relationship by utilizing an endwise sliding fit or snap-fit wherein the two ribs 210 and 220 are slid past one another in vertically opposite directions as viewed in FIG. 16 until they reach the fully intercoupled position shown in FIG. 16. It is to be understood that there is sufficient flex in the legs 208 and 218 to allow them to resiliently yield and then snap-back into locking engagement for releasably retaining two holders so intercoupled by the rails 202 and 212. It is to be noted that in the intercoupled and interlocked relationship of rails 202 and 212 as shown in FIG. 16, rib 206 abuts the outer surface of wall 22, and rib 216 likewise slidably abuts the outer surface of wall 24. This abutment along with the intercoupling of legs 208 and 218 is dimensioned to insure that the holders 200 are held together squarely, i.e., with walls 22 and 24 of the respective holders held parallel to one another.

The L-shaped rails 202 and 212 are also oriented so that the center line of the intercoupled structure, denoted C/L in FIG. 16, is coincident with the center line of the walls 24, 22 taken vertically in the height dimension of holder 200. It is also to be understood that this orientation of the intercoupling rails 202 and 212 is also preferred for the ball rails 172-178 of the sixth embodiment of FIGS. 14 and 15 as well as the rib and channel intercoupling structure of the first embodiment of FIGS. 1 through 6 with respect to rib 50 and channel 60. This center-line orientation of the holder intercoupling structure enables a universal fit so that the top and bottom edges of the side walls 22 and 24 of adjacent holders when coupled together are always coplanar even if one of the holders is inverted from its relationship shown in FIG. 16, whereby the respective center panel webs 26 will be vertically offset relative to one another from holder to holder.

L-rails 202 and 212 are advantageous in that they permit two modes of intercoupling motion, namely endwise slide together or vertical snap-fit, are easier to extrude than the rib and channel configurations of ribs 50 and channel 60 of the first embodiment and are easier to put together and take apart with wider tolerances than is the case with the first embodiment.

While various novel features of the present invention have been shown and described and are pointed out in the accompanying claims, with particular reference to the disclosed embodiments, it will be understood by those skilled in the art with the benefit of the foregoing disclosure that various omissions, substitutions, variations and modifications in form and details can be made without departing from the teachings of the present invention, and therefore the invention is intended to be limited only by the scope of the appended claims and applicable prior art.

We claim:

1. A one-piece, lightweight, hand-holdable holder for VCR and TV keyboard remote control units and other articles of like dimension, said holder being injection molded or extruded in one piece from plastic material to form two planar, parallel side walls spaced apart and integrally interconnected by a central web, said side walls and central web being generally co-extensive in length and having an overall length dimension at least about twice the spacing between said side walls, said holder having a generally "H" configuration in cross-section transverse to the longitudinal axis of said holder, said central web having first and second flat surfaces on opposite sides thereof, said side walls having portions flanking said web surfaces and protruding respectively therefrom to define with the associated web surfaces first and second remote control receiving spaces apart for removable affixation therein of associated first and second removable remote control units by separate adhesive strips attached to an underside of each remote control unit and to the opposite surfaces of said center web to thereby removably mount said remote control units keyface-outwardly and in back-to-back inverted relationship relative to one another on said holder, said side walls and central web having free edges at opposite longitudinal ends thereof formed to provide open, unobstructed end opening spaces to permit the remote control units to project beyond the opposite longitudinal ends of said holder when mounted in said first and second holder spaces, said side walls protruding from said central web to free longitudinal edges of said side walls defining first and second side wall height dimensions a distance sufficient to enable nesting of the remote control units respectively in the associated one of said first and second holder spaces such that said holder supports either remote control unit when inverted with said holder with the remote control unit keyboard spaced clear of a flat supporting surface on which the holder is placed.

2. A holder as set forth in claim 1 wherein an exterior surface of one of said side walls has a rib-like protrusion generally T-shaped in transverse cross section to the holder longitudinal axis and extending longitudinally therealong, and an exterior surface of the other of said side walls has a channel-shaped protrusion extending longitudinally therealong and comprising mutually facing spaced apart pair of ribs having an L-shape in transverse cross section to the holder longitudinal axis, said rib-like protrusion being endwise slidably internestable in said channel shaped protrusion of an associated second holder constructed in the same fashion to thereby provide holder intercoupling structure for releasably attaching together a pair of said holders.

3. A holder as set forth in claim 2 wherein said rib-like protrusion and said channel shaped protrusion each comprises a continuous extrusion extending the full length of said holder and terminating at their opposite longitudinal ends flush with the opposite longitudinal ends of said holder.

4. A holder as set forth in claim 2 wherein said channel shaped protrusion compress a series longitudinal staggered upper and lower rows of mutually facing L-shaped ribs to define an interrupted channel for receiving said T-shaped rib-like protrusion endwise in the interrupted channel space defined by said L-shaped ribs of said channel shaped protrusion.

5. A holder as set forth in claim 1 wherein said "H" cross sectional configuration is asymmetrical in that the distance from said second surface on said central web to a second free longitudinal edge of said side walls, the difference in said distances being predetermined to respectively accommodate in said first and second holder spaces the maximum and minimum thickness dimensions of a majority of commercially available remote control units such that one of the thinner units is individually nestable in recessed relation between the lesser side wall height dimension and one of the thicker units is individually nestable between the greater side wall height dimension.

6. The combination of a plurality of holders each constructed as set forth in claim 1 wherein a pair of said holders are coupled in side-by-side relation by releasable attaching means.

7. A holder as set forth in claim 1 wherein an exterior surface of one of said side walls is provided with a removable label means with notation indicia means thereon.

8. A holder as set forth in claim 1 wherein one of said side walls has a first pair of ball rails protruding laterally from an exterior surface thereof and extending with their axes parallel to the longitudinal axis of said holder, said first pair of balls rails being spaced a first predetermined distance apart in a direction perpendicular to their longitudinal axes, and wherein the other of said side walls has a second pair of ball rails protruding laterally from an exterior surface thereof and extending with their axes parallel to the longitudinal axis of the holder, said second pair of ball rails being spaced apart in a direction perpendicular to their longitudinal axes a second predetermined distance greater than said first distance such that said second pair of ball rails may be yieldably snap fit onto said first pair of ball rails of a second holder of like construction to thereby releasably couple together two of said holders.

9. The holder as set forth in claim 2 further including a hand writing implement holder member having an attachment portion shaped for releasable engagement with one of said protrusions of said holder intercoupling structure.

10. A holder as set forth in claim 1 wherein one of said side walls has a coupling rail protruding laterally from an exterior surface thereof and extending with its axis parallel to the longitudinal axis of the holder, said rail having an L-shape in transverse cross section taken in a plane perpendicular to the longitudinal axis of said holder so as to have a horizontally protruding leg and a vertically protruding leg spaced outwardly from the associated side wall of the holder, the other of the side walls of said holder having another coupling rail identical in configuration to said first coupling rail but oriented with its vertical leg protruding in the opposite direction from the vertical leg of the first rail, the outer edges of said horizontal legs of said first rail of one holder and the second rail of the intercoupled holder respectively abutting the side wall of the coupled holder, said vertical legs having interlocking rib configurations on their free end edges extending longitudinally of the holder to assist in camming engagement and retention engagement of said rails to releasably intercouple a pair of such holders together.

11. A holder as set forth in claims 8 or 10 wherein said rails are oriented in position relative to their associated side walls so that when said rails are intercoupled they are disposed symmetrically about the center line of their respective holder taken vertically or in the height dimension of said respective holder with said holders intercoupled.

12. A holder as set forth in claim 1 wherein one of said side walls has a first lateral protrusion means extending longitudinally therealong and the other of said side walls has a second lateral protrusion means extending longitudinally therealong, said first production means being releasably engagable in internested relationship in said second protrusion means of an associated second holder constructed in the same fashion to thereby provide holder releasably intercoupling structure, said holder further including a hand writing implement holder means having a holder attachment portion shaped for releasable engagement with at least one of said first and second protrusion means and an implement portion shaped for releasable engagement by a hand writing implement.

13. The combination of a holder with a first and second article receiving spaces and two articles supported one in each of said spaces wherein said holder and said article are constructed and arranged as set forth in claims 1 or 8.

14. The combination of a holder and an article as recited in claim 13 wherein each of said article is a TV or VCR remote control unit.

15. A holder as set forth in claim 6 wherein a beveled surface extends on each of said side walls between said terminal end edge and said free longitudinal end edge.

16. A holder as set forth in claim 8 wherein each said ball rail comprises a thickened head portion of circular configuration with a constant radius of curvature, preferably extending through approximately 270°, integrally joined by a thin leg portion having a concave exterior configuration on opposite surfaces matching the curvature of said head portion, and a reverse curvature point preferably located at approximately a 45° angle from a vertical plane taken from a center curvature of said head portion forming equal camming surfaces to allow assembly and disassembly with substantially the same amount of force.

17. A holder as set forth in claim 1 wherein said side walls and said central web have a length of approximately six inches.

18. A holder as set forth in claim 1 wherein said side walls are spaced approximately three inches apart.

19. A holder as set forth in claim 1 wherein said side walls have an overall height dimension of approximately two and one-half inches.

20. A one-hand-holdable remote control unit console including a holder in combination with two VCR or TV remote control units, said holder comprising a central panel-like web means having first and second article receiving surfaces disposed in opposite back-to-back relation to one another, said web means having opposite longitudinal edges along its length and opposite terminal edges along its width, and a pair of spaced parallel side walls each connected one along each opposite longitudinal edge of said web means to extend in planes perpendicular to said surfaces of said web means, said side walls and said web means having an overall length dimension at least about twice the spacing between said side walls, said side walls each having first and second parallel free end edges extending longitudinally of said holder and defining first and second side wall height dimensions measured from said first and second article receiving surfaces, said web means being positioned approximately midway between said side wall first and second free end edges such that said holder generally has an "H" configuration in transverse cross-section to the longitudinal axis of said holder, wherein first and second article receiving spaces are defined by and between said side walls and said first and second surfaces respectively on said web means, said side walls having terminal edges at each longitudinal end thereof, said terminal edges intersecting with said terminal edges of said web means to form substantially a right angle there between defining unobstructed open-end portions coextensive with said first and second article receiving spaces, a first one of said two remote control units removably supported within said first article receiving space and a second one of said remote control units removably supported within said second article receiving space.

21. The console as set forth in claim 20 wherein said side walls and said web means have a length of approximately six inches.

22. The console as set forth in claim 20 wherein said side walls are spaced approximately three inches apart.

23. The console as set forth in claim 20 wherein said side walls have an overall height dimension of approximately two and one-half inches.

* * * * *